United States Patent
Ray

(10) Patent No.: US 9,106,382 B1
(45) Date of Patent: Aug. 11, 2015

(54) QUALITY ADJUSTMENT FOR VOLTE EMERGENCY CALLS

(71) Applicant: Sprint Communications Company L.P., Overland Park, KS (US)

(72) Inventor: Amar Nath Ray, Shawnee, KS (US)

(73) Assignee: Sprint Communications Company L.P., Overland Park, KS (US)

(*) Notice: Subject to any disclaimer, the term of this patent is extended or adjusted under 35 U.S.C. 154(b) by 60 days.

(21) Appl. No.: 14/104,184

(22) Filed: Dec. 12, 2013

(51) Int. Cl.
*H04L 5/00* (2006.01)
*H04M 7/00* (2006.01)
*H04W 4/22* (2009.01)

(52) U.S. Cl.
CPC ............. *H04L 5/0053* (2013.01); *H04M 7/006* (2013.01); *H04W 4/22* (2013.01)

(58) Field of Classification Search
CPC ............................ H04L 5/0048; H04L 5/0053
See application file for complete search history.

(56) References Cited

U.S. PATENT DOCUMENTS

| 8,315,589 | B2 | 11/2012 | Li et al. | |
| 8,396,445 | B2 | 3/2013 | Crawford et al. | |
| 2012/0129550 | A1 | 5/2012 | Hannan et al. | |
| 2012/0164969 | A1 | 6/2012 | Bhatia et al. | |
| 2013/0065550 | A1* | 3/2013 | Green et al. | 455/404.2 |
| 2014/0045450 | A1* | 2/2014 | Ballantyne et al. | 455/404.2 |
| 2014/0086108 | A1* | 3/2014 | Dunn et al. | 370/259 |

* cited by examiner

*Primary Examiner* — Anh Ngoc Nguyen

(57) ABSTRACT

A wireless access node to facilitate communication quality adjustments during voice over long term evolution (VoLTE) communication sessions comprises a wireless communication transceiver and a processing system. The wireless communication transceiver is configured to exchange VoLTE packets with a wireless communication device during a VoLTE emergency call with a public safety answering point (PSAP), and receive a scheduling request transmitted from the PSAP, wherein the scheduling request includes an identifier associated with the wireless communication device and specifies hybrid automatic repeat request (HARQ) settings for the VoLTE emergency call. The processing system is configured to, responsive to the scheduling request, issue a scheduling grant to the wireless communication device based on the HARQ settings specified in the scheduling request.

20 Claims, 6 Drawing Sheets

QUALITY ADJUSTMENT FOR VOLTE EMERGENCY CALLS

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node.

Given the nature of transmitting information in the form of energy over the air, errors can be introduced while the data is in-route to its destination. These errors can be introduced from a variety of factors, such as environmental obstructions, distance between a sender and receiver, strength of the signal being transmitted, and others. This can be especially problematic during voice over long term evolution (VoLTE) communication sessions, where satisfactory performance relies on a constant, uninterrupted flow of voice and/or video data to ensure the parties are able to understand what is being communicated. The problem is particularly relevant during critical and/or time-sensitive calls, such as emergency calls and other critical communications. To address these concerns, error control techniques for data transmissions may be utilized to ensure data is communicated reliably over an unreliable service. One such technique, termed hybrid automatic repeat request (HARQ), provides such error control by encoding data with a forward error correction (FEC) code.

Overview

A method of operating a wireless access node to facilitate communication quality adjustments during voice over long term evolution (VoLTE) communication sessions is disclosed. The method comprises exchanging VoLTE packets with a wireless communication device during a VoLTE emergency call with a public safety answering point (PSAP). The method further comprises receiving a scheduling request transmitted from the PSAP, wherein the scheduling request includes an identifier associated with the wireless communication device and specifies hybrid automatic repeat request (HARQ) settings for the VoLTE emergency call. The method further comprises, responsive to the scheduling request, issuing a scheduling grant to the wireless communication device based on the HARQ settings specified in the scheduling request.

A wireless access node to facilitate communication quality adjustments during voice over long term evolution (VoLTE) communication sessions comprises a wireless communication transceiver and a processing system. The wireless communication transceiver is configured to exchange VoLTE packets with a wireless communication device during a VoLTE emergency call with a public safety answering point (PSAP), and receive a scheduling request transmitted from the PSAP, wherein the scheduling request includes an identifier associated with the wireless communication device and specifies hybrid automatic repeat request (HARQ) settings for the VoLTE emergency call. The processing system is configured to, responsive to the scheduling request, issue a scheduling grant to the wireless communication device based on the HARQ settings specified in the scheduling request.

A computer apparatus to facilitate communication quality adjustments during voice over long term evolution (VoLTE) communication sessions comprises software instructions and at least one non-transitory computer-readable storage medium storing the software instructions. The software instructions are configured, when executed by a wireless access node, to direct the wireless access node to exchange VoLTE packets with a wireless communication device during a VoLTE emergency call with a public safety answering point (PSAP). The software instructions are further configured to direct the wireless access node to receive a scheduling request transmitted from the PSAP, wherein the scheduling request includes an identifier associated with the wireless communication device and specifies hybrid automatic repeat request (HARQ) settings for the VoLTE emergency call. The software instructions are further configured to direct the wireless access node to, responsive to the scheduling request, issue a scheduling grant to the wireless communication device based on the HARQ settings specified in the scheduling request.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
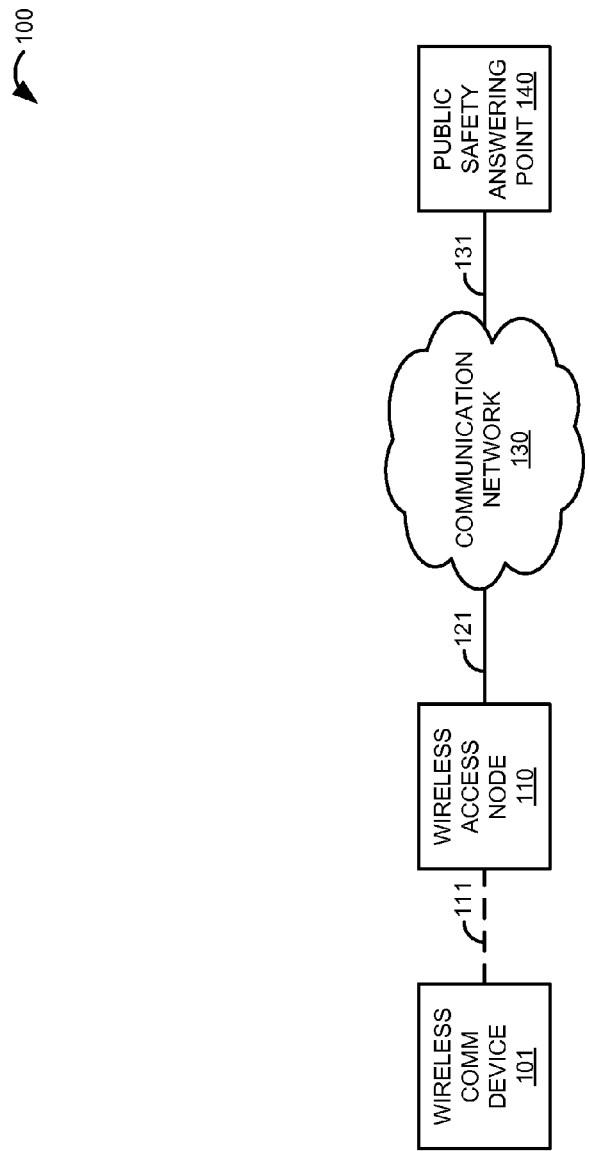
FIG. 1 is a block diagram that illustrates a communication system.

FIG. 1 is a block diagram that illustrates communication system 100. Communication system 100 includes wireless communication device 101, wireless access node 110, communication network 130, and public safety answering point (PSAP) 140. Wireless communication device 101 and wireless access node 110 are in communication over wireless communication link 111. Wireless access node 110 and communication network 130 communicate over communication link 121. Communication network 130 and PSAP 140 are in communication over communication link 131.

Figure 2:
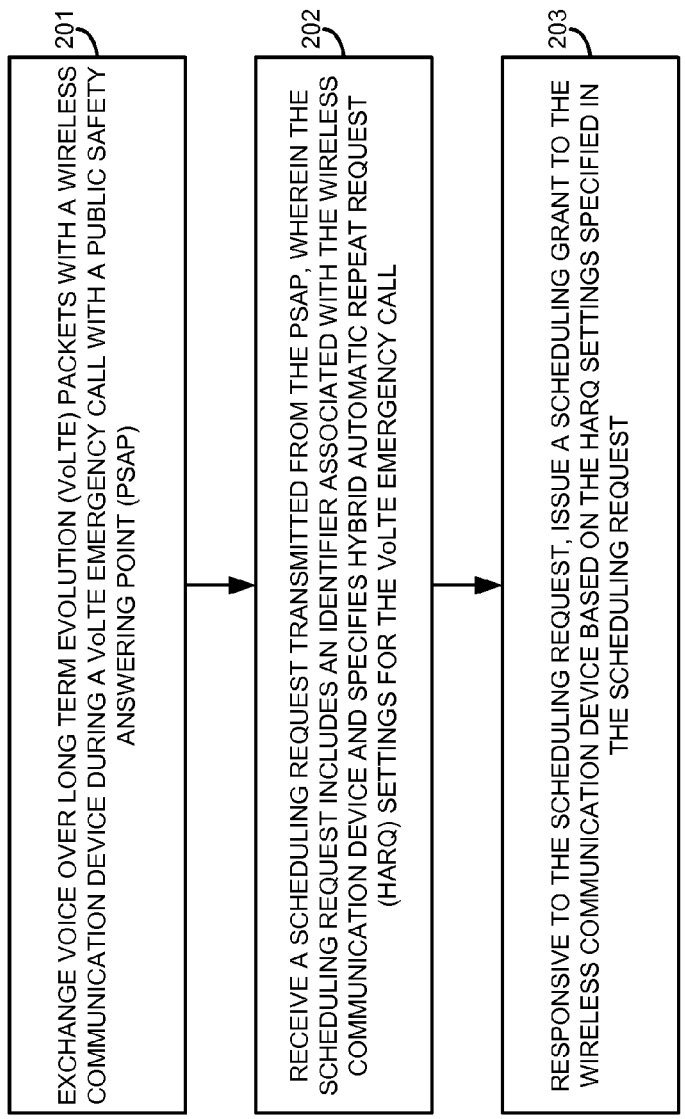
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to facilitate communication quality adjustments during voice over long term evolution (VoLTE) communication sessions.

As shown in the operational flow of FIG. 2, wireless access node 110 exchanges VoLTE packets with wireless communication device 101 during a VoLTE emergency call with PSAP 140 (201). The VoLTE emergency call with PSAP 140 typically comprises a real-time voice and/or video chat session, although other types of communication sessions that utilize VoLTE packets are also possible. The VoLTE packets exchanged between wireless access node 110 and wireless communication device 101 during the VoLTE communication session could comprise any type of data, such as packetized voice data, signaling messages, frames, or any other data message. The VoLTE packets exchanged between wireless access node 110 and wireless communication device 101 are typically communicated using a real-time transport protocol (RTP), although other protocols could be used in some examples.

Wireless access node 110 receives a scheduling request transmitted from PSAP 140 (202). The scheduling request includes an identifier associated with wireless communication device 101 and specifies hybrid automatic repeat request (HARQ) settings for the VoLTE emergency call (202). The identifier associated with wireless communication device 101 included in the scheduling request could comprise a Mobile Station International Subscriber Directory Number (MSISDN) or some other telephone number, Mobile Station Identifier (MSID), Electronic Serial Number (ESN), Mobile Equipment Identifier (MEID), International Mobile Equipment Identity (IMEI), Media Access Control Identifier (MACID), or some other identifier that uniquely identifies wireless communication device 101—including combinations thereof. In some examples, the HARQ settings specified in the scheduling request could include a specified number of HARQ timeslots and/or a specified number of HARQ cycles. The scheduling request is typically received by wireless access node 110 in response to PSAP 140 observing a communication link problem experienced by wireless communication device 101 causing suboptimal voice and/or video quality during the VoLTE emergency call with PSAP 140. In some examples, PSAP 140 could be configured to automatically transmit the scheduling request, while in other examples, an operator at PSAP 140 could manually transmit the scheduling request for delivery to wireless access node 110.

In some examples, PSAP 140 is configured to query for a location of wireless communication device 101 and determine the number of HARQ cycles to specify in the scheduling request based on the location of wireless communication device 101. For example, the location of wireless communication device 101 could comprise a geo associated with the location of wireless communication device 101. In this case, PSAP 140 could be configured to determine the number of HARQ cycles to specify in the scheduling request by using the geo to determine the number of HARQ cycles from a database that relates a plurality of geo values to corresponding numbers of HARQ cycles. Other techniques of determining the number of HARQ cycles that PSAP 140 should specify in the scheduling request are possible and within the scope of this disclosure.

Responsive to the scheduling request, wireless access node 110 issues a scheduling grant to wireless communication device 101 based on the HARQ settings specified in the scheduling request (203). Typically, the HARQ settings on which the scheduling grant is based function to improve the delivery process of the VoLTE packets exchanged between wireless communication device 101 and wireless access node 110 during the VoLTE emergency call with PSAP 140. As discussed above, the HARQ settings specified in the scheduling request could include a specified number of HARQ timeslots and/or a specified number of HARQ cycles in some examples. For example, wireless access node 110 could issue the scheduling grant to increase a number of HARQ timeslots and decrease a number of HARQ cycles. Each HARQ timeslot that is added by the scheduling grant typically increases transmission time delay, but also helps ensure that data in the VoLTE packets is successfully communicated.

Advantageously, wireless access node 110 issues a scheduling grant in response to a scheduling request transmitted from PSAP 140 during a VoLTE emergency call with wireless communication device 101. By receiving the HARQ settings in the scheduling request transmitted by PSAP 140, wireless access node 110 attempts to improve the communication quality of the VoLTE emergency call by issuing the modified scheduling grant to wireless communication device 101. In this manner, data in the VoLTE packets is more likely to be fully communicated due to the improved HARQ settings, thereby helping to ensure that the parties to the VoLTE emergency call can successfully communicate with each other so that the required emergency services are provided timely and effectively.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Public safety answering point (PSAP) 140 comprises any network or collection of networks capable of receiving and terminating an emergency call from communication network 130. PSAP 140 could comprise various network elements, such as routers, servers, processors, and switches, well known in the art for the provisioning and delivery of communication services. For example, PSAP 140 could comprise telecommunications equipment such as a selective router and an Automatic Location Identification (ALI) database. In addition, PSAP 140 could comprise an emergency service such as a police service, fire service, emergency medical service, Government Emergency Telecommunications Service (GETS), or some other emergency service network—including combinations thereof. In one example, PSAP 140 comprises any emergency service network that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
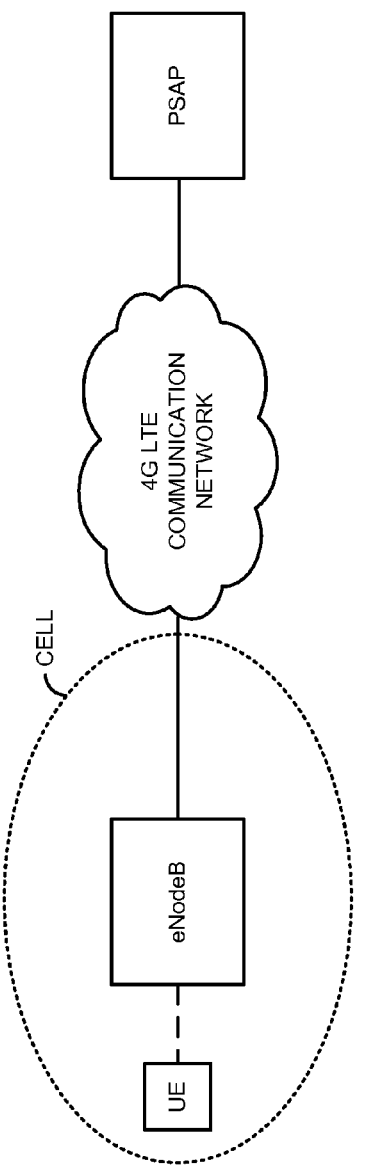
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with the 4G LTE communication network. The eNodeB base station provides an example of wireless access node 110, although node 110 may use alternative configurations. 4G LTE communication network could include a mobility management entity (MME), serving gateway (SG), packet data network gateway (PDNG), and other network elements typically found in a 4G LTE communication network. The eNodeB shown has a wireless coverage area with approximate boundaries as indicated by the dotted line encircling it, which is typically defined by the signal propagation characteristics and coverage capabilities of the eNodeB. LTE communication system 300 also includes a user equipment (UE) device which is shown as being served by the eNodeB base station. The cell surrounding the eNodeB could be referred to as a serving cell for the UE located within it. A public safety answering point (PSAP), also in communication with the LTE communication network, is capable of handling emergency calls from the UE.

In operation, the UE typically issues scheduling requests to the eNodeB for resource allocation during each transmission time interval (TTI). Both uplink and downlink scheduling mechanisms are important, but for voice services over LTE, the uplink scheduler draws more attention with the successful development of VoLTE. The uplink scheduling process includes a scheduling request transmitted by the UE to the scheduler in the eNodeB, which responds with an appropriate scheduling grant. The UE may then provide data and buffer status to the scheduler so the scheduler can assess the efficacy of the scheduling grant. However, during a VoLTE emergency call between a PSAP and the UE, the PSAP may observe poor call quality from the UE when, for example, voice packets transmitted by the UE are being dropped before reaching the PSAP, causing an operator at the PSAP to miss some or all of the words spoken by a user of the UE. In this case, the PSAP may transmit a scheduling request to the scheduler in the eNodeB in order to prompt the scheduler to issue a modified scheduling grant to the UE in an attempt to improve the call quality. A detailed description of how the scheduler might receive and process a scheduling request for the UE transmitted from the PSAP will now be discussed with respect to FIG. 4.

Figure 4:
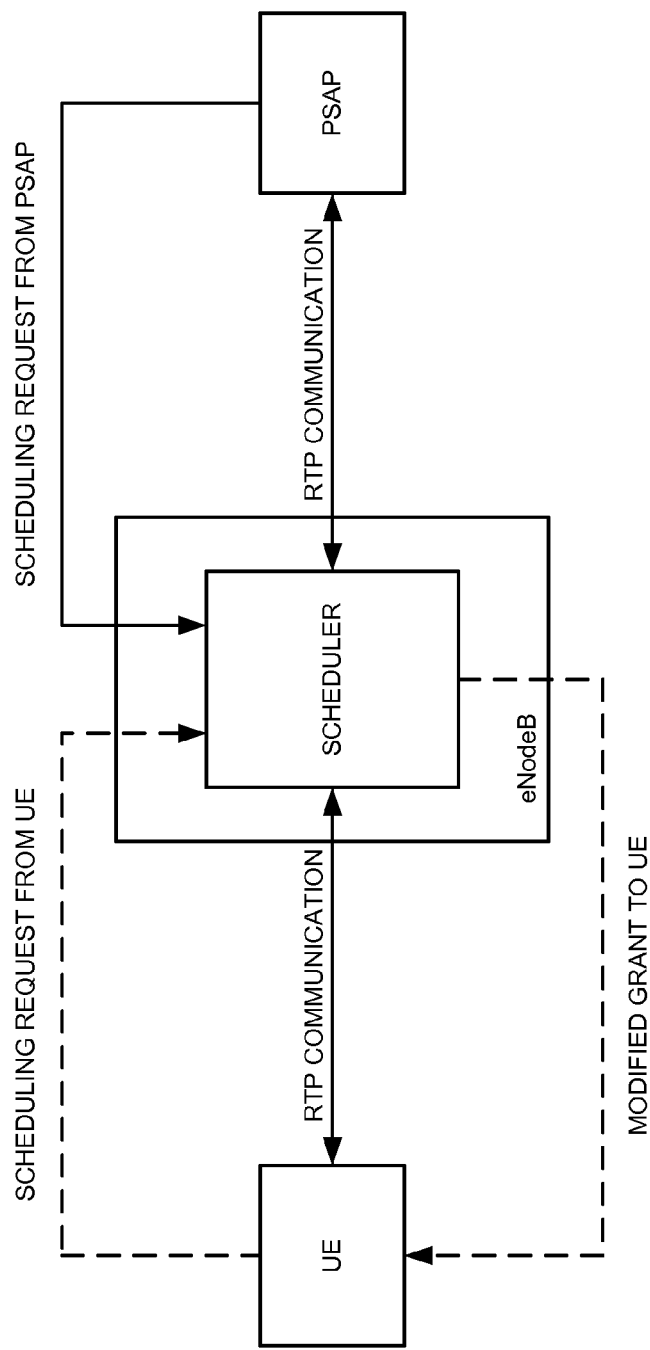
FIG. 4 is a block diagram that illustrates an operation of the communication system in an exemplary embodiment.

FIG. 4 is a block diagram that illustrates an operation of communication system 300 in an exemplary embodiment. In this example, the eNodeB includes a scheduler which is responsible for processing scheduling requests and issuing scheduling grants. Initially, upon identifying a communication link problem during a VoLTE communication session, the UE will send a scheduling request to the scheduler in the eNodeB in an attempt to improve the delivery process. However, in this example, the PSAP also transmits a scheduling request to the scheduler in the eNodeB to request an extra grant to the UE. The scheduling request from the PSAP includes a device identifier that uniquely identifies the UE to the eNodeB, along with a requested number of HARQ cycles to be applied for the UE in a scheduling grant.

The scheduling request from the PSAP could be transmitted to the scheduler in the eNodeB under at least two different circumstances. In one example, a PSAP operator can manually send the scheduling request to the eNodeB. This may occur, for example, when the PSAP operator who is party to a VoLTE emergency call observes a communication problem with the UE, such as delayed or missing audio, jittery video, or the like. Upon receiving the scheduling request from the PSAP, the eNodeB will send the appropriate grant to the UE. The request for scheduling can be controlled by the PSAP operator. At a minimum, the scheduling request typically includes at least a device identifier that identifies the UE. In some examples, the PSAP operator may provide additional parameters as well, such as a specified number of HARQ cycles and/or HARQ timeslots for the eNodeB to apply to the UE in a modified scheduling grant. In other examples, the scheduling request sent by the PSAP operator may simply notify the eNodeB of poor communication quality experienced with the UE, and the eNodeB may decide how to alter the HARQ settings for the UE to improve the quality. Once the scheduling grant is issued to the UE and the new HARQ settings have taken effect, the PSAP operator should observe increased communication performance and clearer voice and/or video transmissions from the UE.

In another example, the PSAP may automatically send a scheduling request to the eNodeB on behalf of the UE. For example, based on information obtained from challenging a location status of the UE from an evolved serving mobile location center (E-SMLC) in the control plane and the secure user plane location (SUPL) location platform (SLP), the PSAP can automatically send a scheduling request to the eNodeB. The scheduling request that is automatically sent by the PSAP to the eNodeB could include specified HARQ settings intended for inclusion in a modified scheduling grant for the UE. By referencing a database using a geo location of the UE, the PSAP could obtain these settings from the database that relates a plurality of geo values to corresponding HARQ settings for that location. A more detailed process flow for a VoLTE emergency call in the control plane will now be described with respect to FIG. 5.

Figure 5:
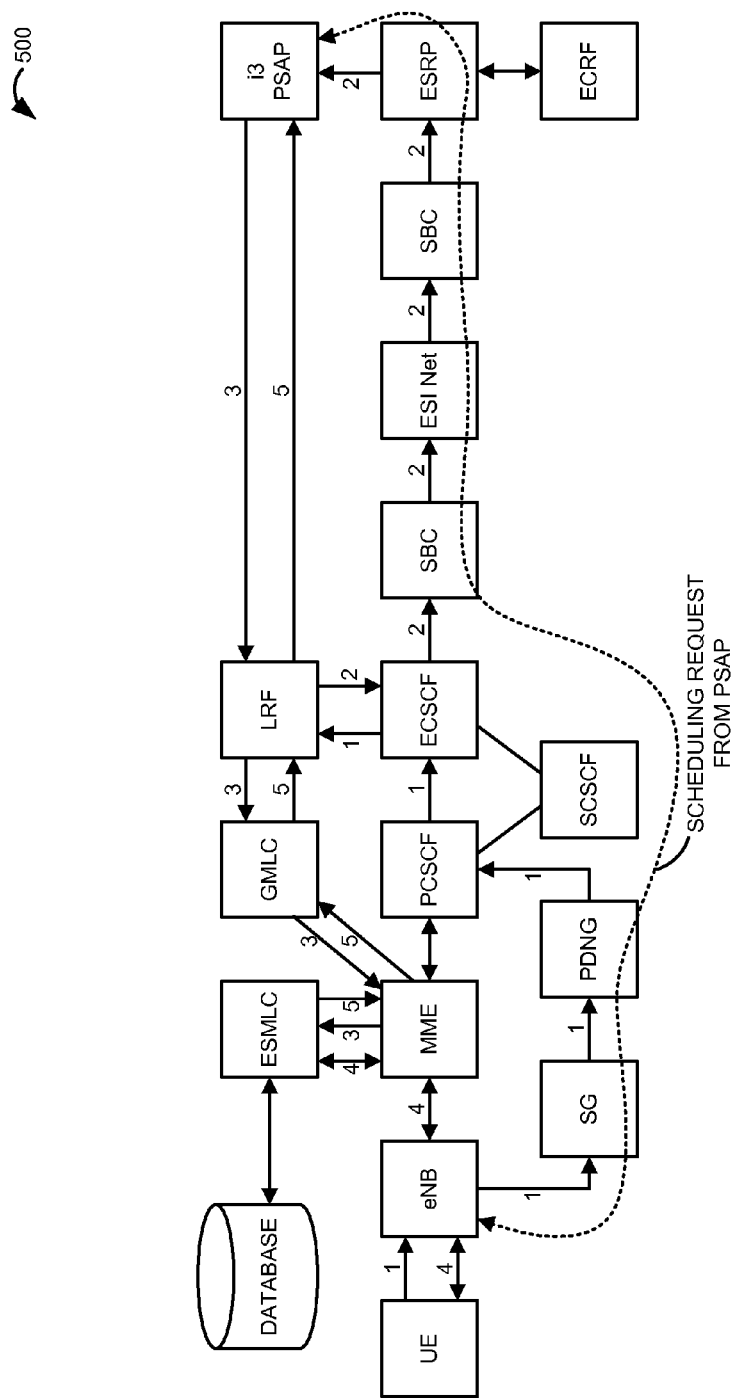
FIG. 5 is a block diagram that illustrates an operation of an LTE communication system in an exemplary embodiment.

FIG. 5 is a block diagram that illustrates an operation of LTE communication system 500 in an exemplary embodiment. FIG. 5 shows the call flow for a VoLTE 9-1-1 emergency call in the control plane. LTE communication system 500 includes a database, user equipment (UE) wireless communication device, eNodeB (eNB) base station, enhanced serving mobile location center (ESMLC), mobility management entity (MME), serving gateway (SG), gateway mobile location controller (GMLC), proxy call session control function (PCSCF), packet data network gateway (PDNG), location retrieval function (LRF), enhanced call session control function (ECSCF), serving call session control function (SCSCF), session border controller (SBC), emergency services IP network (ESI Net), i3 public safety answering point (PSAP), emergency services routing protocol (ESRP), and emergency call routing function (ECRF). The call flow is broken into five different segments for clarity, with each step of a segment designated with one of the digits one through five in this example which indicate the order and direction of each step of the call flow.

In operation, a user of the UE initiates a VoLTE emergency call by dialing 9-1-1. Following the steps that are marked with the number one, to initiate the VoLTE emergency call, the UE sends a session initiation protocol (SIP) invite message all the way to the LRF by way of the eNB, SG, PDNG, PCSCF, and ECSCF. Next, the steps marked with the number two show that the ECSCF receives a location uniform resource locator (URI) from the LRF. The ECSCF then passes the SIP invite message along with the location URI to the appropriate i3 PSAP by way of the SBC, ESI Net, another SBC, ESRP and finally the i3 PSAP. The ECRF and the ESRP typically exchange information during this message transfer as well.

Once the PSAP receives the SIP invite message with the location URI, the PSAP sends a query to the LRF for the location of the UE based on the URI, which is shown by the arrow marked with the number three between the PSAP and the LRF in FIG. 3. The LRF sends a location request to the ESMLC via the appropriate GMLC and MME as shown by the arrows marked with the number three.

Following the steps that are marked with the number four, the ESMLC interacts with the MME, eNB, and UE using the LTE positioning protocol (LPP) to obtain the location of the UE. Once the ESMLC has the location of the UE, the ESMLC will obtain HARQ settings from the database. The database relates various locations to corresponding HARQ settings for each location, which could be predetermined and/or updated dynamically as the network discovers what HARQ settings work best for each location. The ESMLC typically queries the database with the location of the UE to obtain the HARQ settings for that location.

Finally, following the steps that are marked with the number five, the ESMLC sends the location of the UE and its corresponding HARQ settings to the PSAP via the MME, GMLC, and LRF. Then, if equipment at the PSAP detect a problem with the call quality during the emergency call with the UE, such as dropped audio packets or the like, the PSAP can send a scheduling request to the eNB on behalf of the UE, as shown by the dotted line in FIG. 5. In particular, the PSAP sends the scheduling request to the eNB via the ESRP, SBC, ESI Net, another SBC, PDNG, and the SG. The PSAP can include the HARQ settings in the scheduling request so that the eNB can issue a modified scheduling grant using these HARQ settings. After the modified scheduling grant is in effect, the call quality of the VoLTE emergency call should improve due to the HARQ settings that are optimized for the current location of the UE, thereby allowing the PSAP operator to understand the caller on the UE and render the necessary emergency services.

Figure 6:
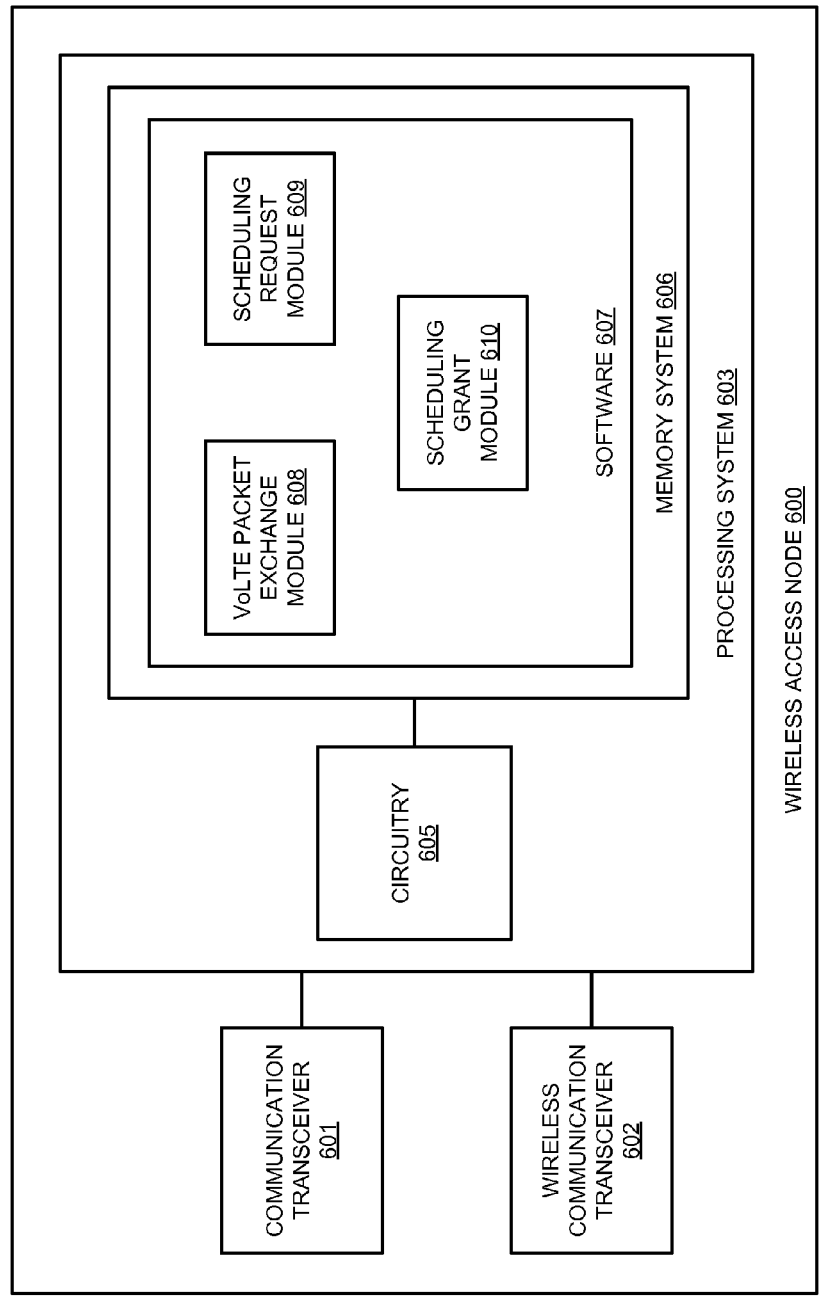
FIG. 6 is a block diagram that illustrates a wireless access node.

FIG. 6 is a block diagram that illustrates wireless access node 600. Wireless access node 600 provides an example of wireless access node 110, although node 110 may have alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 602 could be configured to exchange VoLTE packets with a wireless communication device during a VoLTE emergency call with a public safety answering point (PSAP). Wireless communication transceiver 602 could also be configured to receive a scheduling request transmitted from the PSAP, wherein the scheduling request includes an identifier associated with the wireless communication device and specifies hybrid automatic repeat request (HARQ) settings for the VoLTE emergency call. Wireless communication transceiver 602 could also be configured to, responsive to the scheduling request, issue a scheduling grant to the wireless communication device based on the HARQ settings specified in the scheduling request.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. In some examples, a computer apparatus could comprise memory system 606 and operating software 607. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in other examples.

When executed by circuitry 605, operating software 607 directs processing system 603 to operate as described herein for wireless access node 110. In particular, operating software 607 may direct processing system 603 to direct wireless communication transceiver 602 to exchange VoLTE packets with a wireless communication device during a VoLTE emergency call with a public safety answering point (PSAP). Operating software 607 directs processing system 603 to direct wireless communication transceiver 602 to receive a scheduling request transmitted from the PSAP, wherein the scheduling request includes an identifier associated with the wireless communication device and specifies hybrid automatic repeat request (HARQ) settings for the VoLTE emergency call. Operating software 607 further directs processing system 603 to, responsive to the scheduling request, issue a scheduling grant to the wireless communication device based on the HARQ settings specified in the scheduling request.

In this example, operating software 607 comprises a VoLTE packet exchange software module 608 that exchanges VoLTE packets with a wireless communication device during a VoLTE emergency call with a public safety answering point (PSAP). In addition, operating software 607 comprises a scheduling request software module 609 that receives a scheduling request transmitted from the PSAP, wherein the scheduling request includes an identifier associated with the wireless communication device and specifies hybrid automatic repeat request (HARQ) settings for the VoLTE emergency call. Operating software 607 also comprises a scheduling grant software module 610 that, responsive to the scheduling request, issues a scheduling grant to the wireless communication device based on the HARQ settings specified in the scheduling request.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to facilitate communication quality adjustments during voice over long term evolution (VoLTE) communication sessions, the method comprising:
   exchanging VoLTE packets with a wireless communication device during a VoLTE emergency call with a public safety answering point (PSAP);
   receiving a scheduling request transmitted from the PSAP, wherein the scheduling request includes an identifier associated with the wireless communication device and specifies hybrid automatic repeat request (HARQ) settings for the VoLTE emergency call; and
   responsive to the scheduling request, issuing a scheduling grant to the wireless communication device based on the HARQ settings specified in the scheduling request.

2. The method of claim 1 wherein the HARQ settings specified in the scheduling request include a number of HARQ timeslots and a number of HARQ cycles.

3. The method of claim 1 wherein issuing the scheduling grant based on the HARQ settings comprises issuing the scheduling grant to increase a number of HARQ timeslots and decrease a number of HARQ cycles.

4. The method of claim 1 wherein the PSAP is configured to query for a location of the wireless communication device and determine the number of HARQ cycles to specify in the scheduling request based on the location of the wireless communication device.

5. The method of claim 4 wherein the location of the wireless communication device comprises a geo associated with the location of the wireless communication device.

6. The method of claim 5 wherein the PSAP configured to determine the number of HARQ cycles to specify in the scheduling request comprises the PSAP configured to use the geo to determine the number of HARQ cycles from a database that relates a plurality of geo values to corresponding numbers of HARQ cycles.

7. The method of claim 1 wherein an operator at the PSAP manually transmits the scheduling request for delivery to the wireless access node.

8. A wireless access node to facilitate communication quality adjustments during voice over long term evolution (VoLTE) communication sessions, the wireless access node comprising:
   a wireless communication transceiver configured to exchange VoLTE packets with a wireless communication device during a VoLTE emergency call with a public safety answering point (PSAP), and receive a scheduling request transmitted from the PSAP, wherein the scheduling request includes an identifier associated with the wireless communication device and specifies hybrid automatic repeat request (HARQ) settings for the VoLTE emergency call; and a processing system configured to, responsive to the scheduling request, issue a scheduling grant to the wireless communication device based on the HARQ settings specified in the scheduling request.

9. The wireless access node of claim 8 wherein the HARQ settings specified in the scheduling request include a number of HARQ timeslots and a number of HARQ cycles.

10. The wireless access node of claim 8 wherein issuing the scheduling grant based on the HARQ settings comprises issuing the scheduling grant to increase a number of HARQ timeslots and decrease a number of HARQ cycles.

11. The wireless access node of claim 8 wherein the PSAP is configured to query for a location of the wireless communication device and determine the number of HARQ cycles to specify in the scheduling request based on the location of the wireless communication device.

12. The wireless access node of claim 11 wherein the location of the wireless communication device comprises a geo associated with the location of the wireless communication device.

13. The wireless access node of claim 12 wherein the PSAP configured to determine the number of HARQ cycles to specify in the scheduling request comprises the PSAP configured to use the geo to determine the number of HARQ cycles from a database that relates a plurality of geo values to corresponding numbers of HARQ cycles.

14. The wireless access node of claim 8 wherein an operator at the PSAP manually transmits the scheduling request for delivery to the wireless access node.

15. A computer apparatus to facilitate communication quality adjustments during voice over long term evolution (VoLTE) communication sessions, the apparatus comprising:
software instructions configured, when executed by a wireless access node, to direct the wireless access node to exchange VoLTE packets with a wireless communication device during a VoLTE emergency call with a public safety answering point (PSAP), receive a scheduling request transmitted from the PSAP, wherein the scheduling request includes an identifier associated with the wireless communication device and specifies hybrid automatic repeat request (HARQ) settings for the VoLTE emergency call, and responsive to the scheduling request, issue a scheduling grant to the wireless communication device based on the HARQ settings specified in the scheduling request; and
at least one non-transitory computer-readable storage medium storing the software instructions.

16. The computer apparatus of claim 15 wherein the HARQ settings specified in the scheduling request include a number of HARQ timeslots and a number of HARQ cycles.

17. The computer apparatus of claim 15 wherein the software instructions configured to direct the wireless access node to issue the scheduling grant based on the HARQ settings comprises wherein the software instructions configured to direct the wireless access node to issue the scheduling grant to increase a number of HARQ timeslots and decrease a number of HARQ cycles.

18. The computer apparatus of claim 15 wherein the PSAP is configured to query for a location of the wireless communication device and determine the number of HARQ cycles to specify in the scheduling request based on the location of the wireless communication device.

19. The computer apparatus of claim 18 wherein the location of the wireless communication device comprises a geo associated with the location of the wireless communication device.

20. The computer apparatus of claim 19 wherein the PSAP configured to determine the number of HARQ cycles to specify in the scheduling request comprises the PSAP configured to use the geo to determine the number of HARQ cycles from a database that relates a plurality of geo values to corresponding numbers of HARQ cycles.

* * * * *